Dec. 8, 1964 T. V. CATTERSON 3,160,736
ANTI-FOGGING MIRROR
Filed Sept. 11, 1962 2 Sheets-Sheet 1
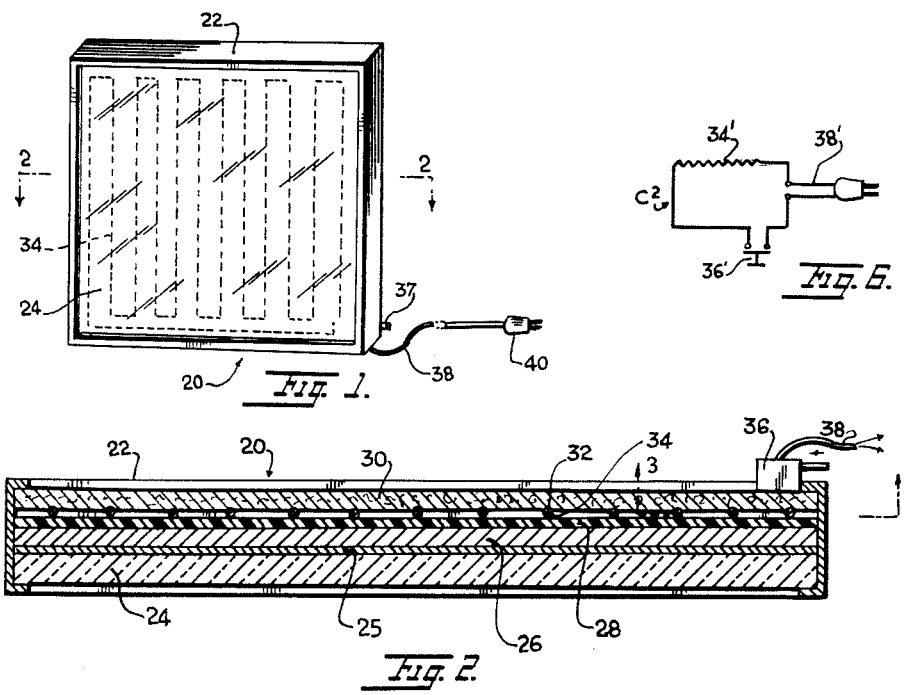
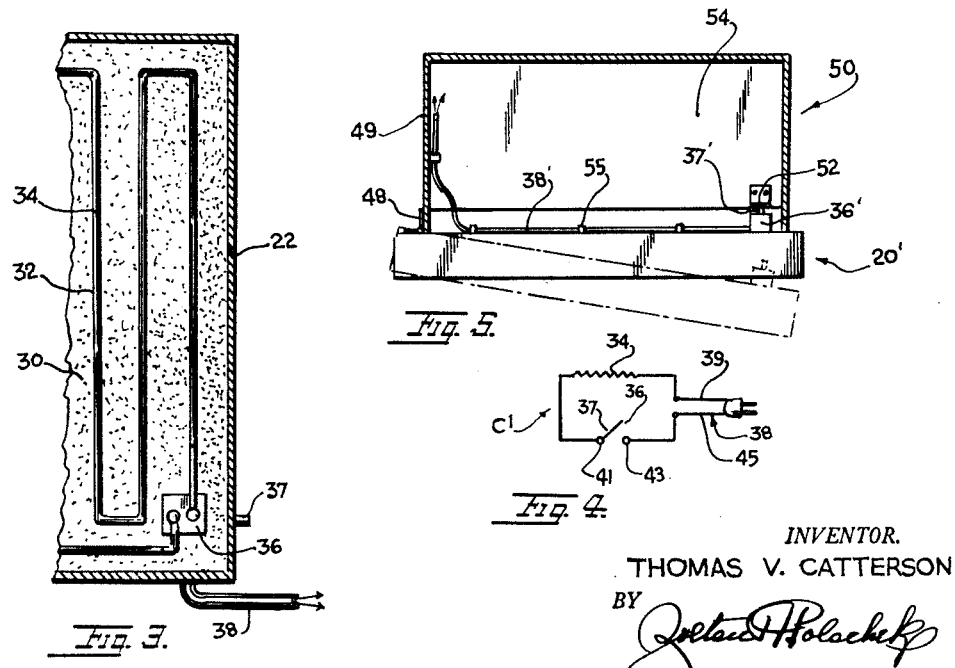
INVENTOR.
THOMAS V. CATTERSON
BY
ATTORNEY

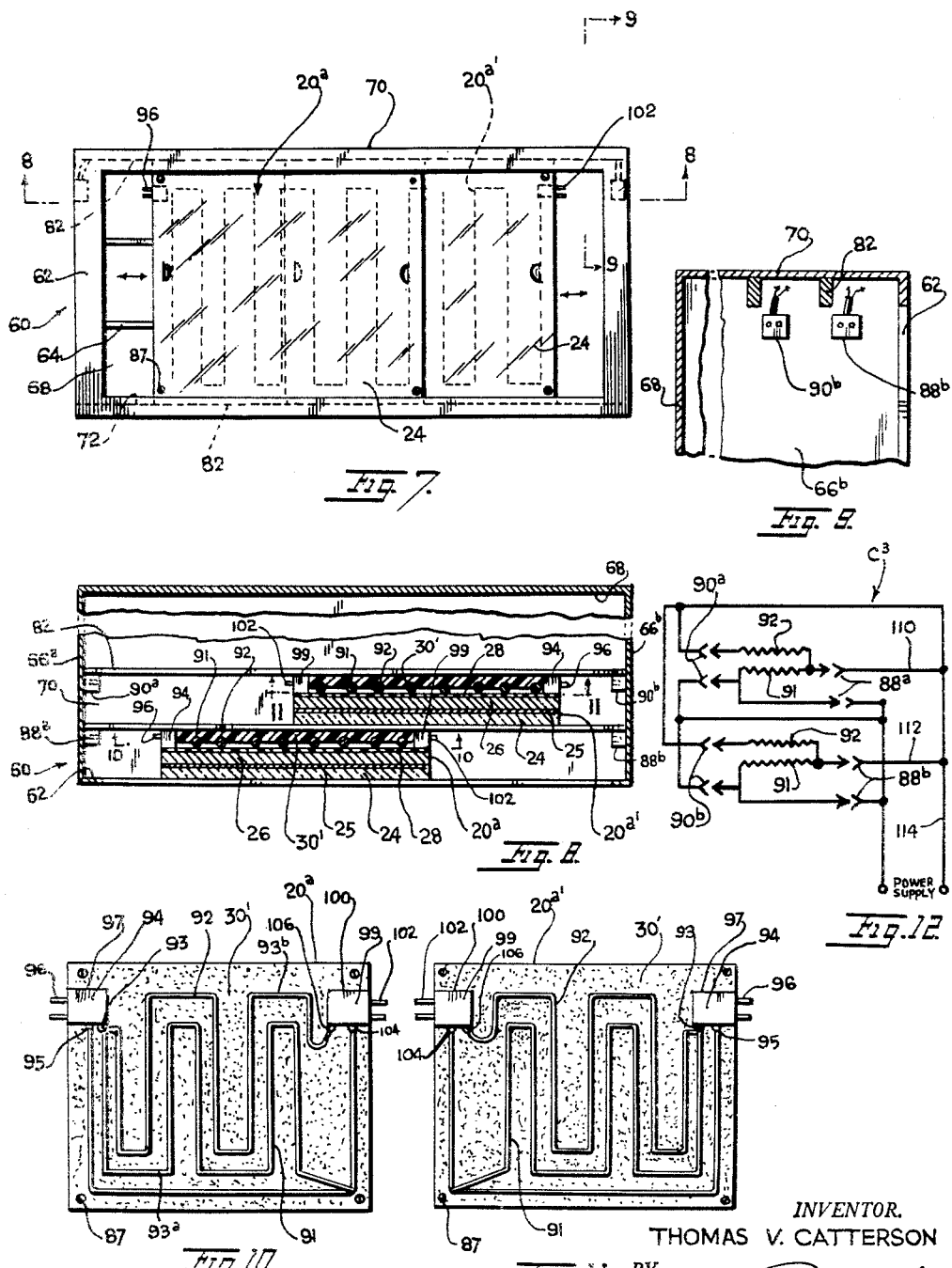

United States Patent Office 3,160,736
Patented Dec. 8, 1964

3,160,736
ANTI-FOGGING MIRROR
Thomas V. Catterson, 159—14 Cross Island Parkway,
Whitestone, N.Y.
Filed Sept. 11, 1962, Ser. No. 222,865
5 Claims. (Cl. 219—219)

This invention concerns an anti-fogging mirror.

The invention involves a mirror assembly having an electrical resistance wire heating element which keeps the mirror in a heated condition to prevent condensation of moisture on the mirror. The mirror assembly has a laminated structure with a heat conductive layer interposed between the heating element and the light reflecting mirror surface for distributing heat uniformly to the mirror. The heating element has an insulation backing and support to retain heat within the assembly. Terminal plugs or switches are connected to the heating element for turning the heating element on and off automatically depending on the position of the mirror assembly. The mirror assembly may be part of a swinging or sliding cabinet door or may be a stationary hanging structure. In one form of the invention a plurality of heating elements are provided in the mirror assembly for automatically varying the heating of the mirror depending on the position of the assembly.

It is therefore a principal object of the invention to provide an anti-fogging mirror assembly including a mirror, heating element, heat distributor and insulation backing all in one laminated structure.

A further object is to provide a mirror assembly as described provided with switches for turning the heating element on and off.

Another object is to provide a mirror assembly as described wherein the assembly includes a plurality of heating elements.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a mirror assembly embodying the invention.

FIG. 2 is a sectional view on an enlarged scale taken on line 2—2 of FIG. 1.

FIG. 3 is a sectional view taken on line 3—3 of FIG. 2.

FIG. 4 is a diagram of an electric circuit employed in the assembly of FIGS. 1–3.

FIG. 5 is a top plan view partially in section of another mirror assembly, embodying a modified form of the invention.

FIG. 6 is a diagram of an electric circuit employed in the assembly of FIG. 5.

FIG. 7 is a front elevational view of a cabinet including another mirror assembly according to another modification of the invention.

FIG. 8 is a cross-sectional view taken on line 8—8 of FIG. 7, parts being broken away.

FIG. 9 is a fragmentary sectional view on an enlarged scale, taken on line 9—9 of FIG. 7, parts being broken away.

FIG. 10 and FIG. 11 are sectional views taken on lines 10—10 and 11—11, respectively, of FIG. 8.

FIG. 12 is a diagram of an electric circuit employed in the cabinet and mirror assemblies of FIG. 7.

Referring first to FIGS. 1, 2 and 3, there is shown a mirror assembly 20 including a rectangular open frame 22 in which is mounted a transparent glass plate 24. The plate is coated at its rear side with a light reflective coating 25 of silver, aluminum or the like. A thin metal sheet 26 is placed adjacent to the coating 25 and serves to distribute heat uniformly over the rear of the mirror plate 24. The metal sheet is coated with a non-electrically conductive film 28 made of a plastic such as silicone resin or the like. A board 30 made of insulation material such as plastic, fiberboard, asbestos or the like is placed adjacent to film 28. The board is formed with a continuous winding or sinuous groove 32 in which is set an electrical resistance heating wire 34. The wire extends partially out of the groove 32 and abuts the rear side of film 28 to apply heat to the sheet 26. Opposite ends of the wire are connected to switch 36 mounted on the rear of board 30. An operating handle or button 37 of the switch extends laterally of the frame. An electric cable 38 is connected to the switch and terminates in a plug 40 which can be inserted in a suitable electric supply receptacle.

The circuit C1 shown in FIG. 4 shows that the resistance wire heating element 34 is connected at one end to power wire 39 of cable 38 terminating at plug 40. The other end of the wire 34 is connected to switch terminal 41. The other switch terminal 43 is connected to power supply wire 45. When the switch is closed the heating element is energized and the mirror plate 24 is warmed up sufficiently to prevent condensation of moisture thereon if the assembly is hung in a bathroom or other place where moisture is liable to collect.

FIG. 5 shows a mirror assembly 20' similar in structure to assembly 20 except that switch 36' is a push button type as indicated in the circuit C2 in FIG. 6. The assembly is provided with a hinge 48 and is mounted as a mirror door on side 49 of a cabinet 50. A stationary lug 52 is mounted on a shelf of the cabinet and serves to press the button 37' when the mirror door is closed. When the mirror door is closed the switch is closed and the heating element 34' is energized. The power supply cable 38' extends along the rear of the assembly and side 49 of the cabinet and is held by clips 55. The cable is flexible and permits the door to be opened and closed without interference. When the cabinet door is opened the circuit through the heating element is broken. Thus the mirror heats up only when the door is closed. The insulation board 30 and glass plate 24 in assembly 20' both serve to retain heat in the assembly so that the cabinet mirror door can be opened for short periods of time without material loss of consequent heat and of anti-fogging effect, while the heating element 34' is temporarily deenergized.

In FIGS. 7–9, there is illustrated a further modified form of the invention including a cabinet 60. The cabinet has two sliding cabinet mirror doors, each of which constitutes a mirror assembly similar to mirror assembly 20, one mirror assembly being indicated at 20$^a$ and the other at 20$^{a'}$. The parts of the assemblies 20$^a$ and 20$^{a'}$ corresponding to assembly 20 are identically numbered. The cabinet has a rectangular open vertical frame 62 at the front, horizontal shelves 64, side walls 66$^a$, 66$^b$, rear wall 68, flat top wall 70 and flat bottom wall 72.

Guide strips 82 are provided on the underside of the top wall 70 and on the upper side of the bottom wall 72. These guide strips are parallel to each other and extend across the cabinet. The rectangular mirror assembly 20$^a$ is movably mounted between the front frame 62 and a pair of guide strips 82 at the top and bottom walls so that the assembly is slidable from one end of the cabinet to the other. The other rectangular mirror assembly 20$^{a'}$ is movably mounted between a pair of guide strips 82 at the top wall and another pair of guide strips at the bottom wall so that the assembly is slidable from one end of the cabinet to the other in a track behind assembly 20$^a$. If desired, grooves could be provided in either one of or both top and bottom cabinet walls in place of the guide strips to provide tracks for guiding movements of the mirror assemblies. The parts of the separate assemblies are held together by screws 87.

Two electrical sockets 88ª, 90ª are mounted on the inner side of wall 66ª in alignment with the parallel mirror assemblies. Two other electrical sockets 88ᵇ, 90ᵇ are mounted on the inner side wall 66ᵇ in alignment with the mirror assemblies.

Each of the mirror assemblies has a zigzag array of two electrical heating elements 91, 92 set in zigzag grooves 93ª, 93ᵇ in board 30'. The heating elements are oppositely wired in the two assemblies. One end of each element is connected to terminal 93 of a plug 94. The other end of element 91 is connected to terminal 95 of plug 94. This plug has two prongs 96 connected to the respective terminals. The prongs extend laterally outward of one edge of the mirror assembly and is mounted near one upper corner thereof in a cutout 97 in insulation board 30'. Another plug 99 is mounted in a cutout 100 in the board at an opposing upper corner. Plug 99 has prongs 102 extending outwardly of the opposite edge of the mirror assembly. The other end of element 91 is connected to terminal 104 of plug 99. The other end of element 92 is connected to terminal 106 of plug 99. The terminals 104, 106 are connected to the respective prongs 102. By this arrangement elements 91, 92 are connected in series to plug 99 while only element 91 is effectively connected to plug 94 since the other element 92 is open circuited at terminal 106 on plug 99.

The plugs and heating elements are arranged on the two mirror assemblies in opposite ways. Thus plug 94 is at the left end of the front assembly 20ª' but is at the right end of rear assembly 20ª' as shown in FIGS. 7, 8, 10 and 11. Plug 99 is at the right end of front assembly 20ª' but is at the left end of rear assembly 20ª''. Heating elements 91, 92 are connected in series across plugs 99 at the right and left ends of the front and rear mirror assemblies respectively. Heating element 91 is alone connected across plug 94 at the left and right ends of the mirror assemblies respectively.

Sockets 88ª and 88ᵇ are connected across the power supply wires 110, 112, respectively, of power cable 114 as shown in circuit C3 of FIG. 12. Sockets 90ª, 90ᵇ are also connected across the power supply wires 110 and 112, respectively. When the mirror assemblies are disposed in the cabinet in a closed position with assembly 20ª at the extreme left and assembly 20ª' at the extreme right, only the heating element 91 in each assembly is connected to socket 88ª or 88ᵇ respectively. The resistance of the heating elements is low and the mirrors are only moderately warmed. When the positions of the assemblies are interchanged with assembly 20ª at the extreme right and assembly 20ª' at the extreme left of the cabinet, then the elements 91, 92 are in series with plugs 90ª, 90ᵇ and the resistance is higher and more heat is generated so that the mirror plates are warmer. This interpositioning of the mirror assemblies thus effects a change in their temperatures and in the amount of moisture condensation they will prevent.

When either or both assemblies are moved away out of engagement with any of the sockets then their heating elements are deenergized and the assemblies are unheated. The insulation backing boards 30' and the glass plates 24 will store up sufficient heat so that the mirror assemblies can be moved aside temporarily to expose any of the shelves of the cabinet without any material loss in heat and anti-fogging effect.

Instead of double heating elements, each of the sliding mirror assemblies can be provided with only a single heating element if temperature variation of the sliding assemblies is not required.

The invention thus makes possible provision of mirrors having anti-fogging characteristics accomplished by electric heating as described.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An anti-fogging mirror assembly, comprising a transparent plate, a light reflective coating on one side of said plate, a thermally conductive sheet abutting said coating to conduct heat to the plate and to distribute heat thereover, an insulation film covering one side of said plate, a plurality of electrical resistance wire heating elements disposed in a flat sinuous array with one side thereof juxtaposed to said film, an insulation backing board abutting and supporting said heating element on the other side thereof, a first electric power supply member having two terminals connected to opposite ends of one of the elements, and another electrical supply member having two other terminals connected to one end of one element and to one end of the other element while the other ends of the elements are connected together, whereby power applied to the first member heats said one element and power supplied to the other member heats both elements together.

2. A cabinet having anti-fogging mirrors, comprising an open box-like structure, a pair of flat rectangular mirror assemblies disposed parallel to each other and slidably mounted in said structure, said structure having guides constraining each of the assemblies to movement in its plane from end to end of said structure, a pair of power supply members mounted at opposite ends of said structure, each of said assemblies comprising a transparent plate, a light reflective coating on one side of said plate, a thermally conductive sheet abutting said coating to conduct heat to the plate and to distribute heat thereover, an electrical resistance wire heating element disposed in a flat sinuous array with one side thereof juxtaposed to said conductive sheet, an insulation backing board abutting and supporting said heating element at the other side thereof, and a plug connected to opposite ends of said element, said plug being disposed to engage one of the power supply members when the assembly is located at one end of the structure; whereby both assemblies are electrically heated when the assemblies are located at opposite ends of said box-like structure.

3. A cabinet having anti-fogging mirrors, comprising an open box-like structure, a pair of flat rectangular mirror assemblies disposed parallel to each other and slidably mounted in said structure, said structure having guides constraining each of the assemblies to movement in its plane from end to end of said structure, a pair of power supply members mounted at opposite ends of said structure, each of said assemblies comprising a transparent plate, a light reflective coating on one side of said plate, a thermally conductive sheet abutting said coating to conduct heat to the plate and to distribute heat thereover, an insulation film covering one side of said plate, an electrical resistance wire heating element disposed in a flat sinuous array with one side thereof juxtaposed to said film, an insulation backing board abutting and supporting said heating element at the other side thereof, and a plug connected to opposite ends of said element, said plug being disposed to engage one of the power supply members when the assembly is located at one end of the structure; whereby both assemblies are electrically heated when the assemblies are located at opposite ends of said box-like structure.

4. A cabinet having anti-fogging mirrors, comprising an open box-like structure, a pair of flat rectangular mirror assemblies disposed parallel to each other and slidably mounted in said structure, said structure having guides contraining each of the assemblies to movement in its plane from end to end of said structure, a pair of power supply members mounted at opposite ends of said structure, each of said assemblies comprising a transparent plate, a light reflective coating on one side of said plate, a thermally conductive sheet abutting said coating to conduct heat to the plate and to distribute heat thereover, an insulation film covering one side of said plate, a plurality of electrical resistance wire heating elements disposed in a flat sinuous array with one side thereof juxtaposed to said film, an insulation backing board abutting and supporting said heating elements on the other side thereof, a first plug having two terminals connected to opposite ends of one of the elements, another plug having two other terminals connected to one end of one element and to one end of the other element while the other ends of the elements are connected together; and another pair of power supply members mounted at opposite ends of said structure adjacent the first-named members, the power supply members at each end of said structure being disposed to connect with a different one of the plugs of the two assemblies when the assemblies are located at ends of said structure, whereby both assemblies are electrically heated at one temperature when one assembly is at one end of said structure and the other assembly is at the other end of said structure, and both assemblies are electrically heated at a desired temperature when the assemblies are reversed in position at opposite ends of said structure.

5. A cabinet having anti-fogging mirror, comprising an open box-like structure, a flat rectangular mirror assembly disposed vertically and slidably mounted in said structure, said structure having guides constraining the assembly for movement in its plane from end to end of said structure, a pair of power supply members mounted at opposite ends of said structure, said assembly comprising a transparent plate, a light reflective coating on one side of said plate, a thermally conductive sheet abutting said coating to conduct heat to the plate and to distribute heat thereover, an insulation film covering one side of said plate, a plurality of electrical resistance wire heating elements disposed in a flat sinuous array with one side thereof juxtaposed to said film, an insulation backing board abutting and supporting said heating elements on the other side thereof, a first plug having two terminals connected to opposite ends of one of the elements, another plug having two other terminals connected to one end of one element and to one end of the other element while the other ends of the elements are connected together, said members being disposed to engage said plugs respectively when said assembly is disposed at opposite ends of said structure, whereby said assembly is heated at one temperature when one of said members engages one plug while said assembly is at one end of said structure and whereby said assembly is heated at another temperature when the other of said members engages the other plug while said assembly is at the other end of said structure.

References Cited by the Examiner
UNITED STATES PATENTS

| | | | |
|---|---|---|---|
| 1,934,110 | 11/33 | Wilson | 219—219 |
| 2,015,816 | 10/35 | Pyzel | 219—219 |
| 2,512,875 | 6/50 | Reynolds | 219—345 |
| 2,514,647 | 7/50 | Jolliffe | 219—219 |
| 2,564,836 | 8/51 | Elsenheimer | 219—219 |
| 2,565,256 | 8/51 | Myers et al. | 219—219 |

RICHARD M. WOOD, *Primary Examiner.*

ANTHONY BARTIS, *Examiner.*